United States Patent [19]
Paniccia et al.

[11] Patent Number: 6,125,217
[45] Date of Patent: Sep. 26, 2000

[54] CLOCK DISTRIBUTION NETWORK

[75] Inventors: Mario J. Paniccia, Santa Clara, Calif.; Ian A. Young, Portland; Thomas P. Thomas, Beaverton, both of Oreg.; Valluri R. M. Rao, Saratoga, Calif.

[73] Assignee: Intel Corporation, Santa Clara, Calif.

[21] Appl. No.: 09/105,502

[22] Filed: Jun. 26, 1998

[51] Int. Cl.[7] .................................. G02B 6/12; G06F 1/04
[52] U.S. Cl. .............................. 385/14; 385/24; 385/129; 385/130; 385/131; 395/555; 395/556; 395/557; 395/558; 395/559
[58] Field of Search ................................ 385/14, 24, 129, 385/130, 131; 395/555, 556, 557, 558, 559

[56] References Cited

U.S. PATENT DOCUMENTS

| | | | |
|---|---|---|---|
| 4,695,120 | 9/1987 | Holder | 385/14 |
| 4,758,092 | 7/1988 | Heinrich et al. | 356/364 |
| 4,761,620 | 8/1988 | Bar-Joseph et al. | 332/7.51 |
| 4,865,427 | 9/1989 | Kingston et al. | 350/355 |
| 4,966,430 | 10/1990 | Weidel | 385/14 |
| 5,009,476 | 4/1991 | Reid et al. | 385/14 X |
| 5,153,770 | 10/1992 | Harris | 359/245 |
| 5,208,879 | 5/1993 | Gallo et al. | 385/14 X |
| 5,349,599 | 9/1994 | Larkins | 372/50 |
| 5,416,861 | 5/1995 | Koh et al. | 385/14 |
| 5,434,434 | 7/1995 | Kasahara et al. | 257/84 |
| 5,442,475 | 8/1995 | Bausman et al. | 359/140 |
| 5,508,835 | 4/1996 | Takahashi et al. | 359/140 |
| 5,565,816 | 10/1996 | Coteus | 331/2 |
| 5,568,574 | 10/1996 | Tanguay, Jr. et al. | 385/14 |
| 5,717,729 | 2/1998 | Iknaian et al. | 375/356 |
| 5,802,132 | 9/1998 | Pathikonda et al. | 377/48 |
| 5,835,646 | 11/1998 | Yoshimura et al. | 385/14 |
| 5,842,001 | 11/1998 | Kubota | 395/551 |
| 5,864,642 | 1/1999 | Chun et al. | 385/14 |
| 5,889,903 | 3/1999 | Rao | 385/14 |

OTHER PUBLICATIONS

B.L. Clymer & J.W. Goodman, "Optical Clock Distribution to Silicon Chips", Optical Engineering, vol. 25 (10) (1986).

H. Zarschizky, et al., "Holographic Optical Elements for Free Space Clock Distribution", SPIE vol. 1389 Internat. Conf. on Advances in Interconnection and Packaging (1990).

C. Sebillotte, "Holographic Optical Backplane for Boards Interconnection", SPIE vol. 1389 Internat. Conf. on Advances in Interconnection and Packaging (1990).

(List continued on next page.)

*Primary Examiner*—Brian Healy
*Attorney, Agent, or Firm*—Blakely, Sokoloff, Taylor & Zafman LLP

[57] ABSTRACT

A method and an apparatus for providing an optical clock distribution network. In one embodiment, an optical source is configured to emit optical pulses at a desired clock frequency. The optical pulses are separated into a plurality of split optical pulses, each of which is received by a clock receiver node in a semiconductor die. In one embodiment, each clock receiver node locally generates a photocurrent in response to the split optical beams. Each of the photocurrents is locally converted into voltage and thus into local clock signals, which are used to clock the local area of the integrated circuit. In one embodiment, the semiconductor die includes an additional clock receiver node used to clock a clock generation circuit included in the semiconductor die. The clock generation circuit generates clock signals that are in phase with each other and the other clock signals generated throughout the semiconductor die. In one embodiment, the clock signals generated by the clock generation circuit are used to clock and phase lock input/output communications on the semiconductor die as well as off chip input/output communications between the semiconductor die and other external semiconductor dice of the system.

25 Claims, 12 Drawing Sheets

OTHER PUBLICATIONS

K. Rajasekharan & T. Michalka, "Proposed Electro–Optic Package with Bi–Directional Lensed Coupling", SPIE vol. 1389 Inter. Conf. on Advances in Interconnection and Packaging (1990).

Y.S. Liu, et al. "Polymer Optical Interconnect Technology (POINT)–Optoelectronic Packaging and Interconnect for–Board and Backplane Applications", Crit. Rev. of Optical Science and Technology SPIE (1995).

H.B. Bakoglu, Circuits, Interconnections, and Packaging for VLSI, Addison–Wesley Publishing Co., Inc., chap. 3 (1990).

CLOCK DISTRIBUTION NETWORK

RELATED APPLICATION

This application is related to application Ser. No. 08/775,408, filed Dec. 31, 1996, now U.S. Pat. No. 5,812,708, entitled "Method and Apparatus for Distributing an Optical Clock in an Integrated Circuit," and assigned to the assignee of the present invention.

BACKGROUND OF THE INVENTION

1. Field of the Invention

The present invention relates generally to integrated circuit clocking and, more specifically, to distributing a clock throughout an integrated circuit system.

2. Background Information

An issue facing the integrated circuit industry today is the problem of distributing clock signals throughout integrated circuit systems and integrated circuit dice with low clock skew. Clock skew is the difference in arrival times of clock edges to different parts of the system. Synchronous digital logic requires precise clocks for the latching of data. Ideal synchronous logic relies on clocks arriving simultaneously to all circuits in the system. Clock skew reduces the maximum operating frequency of the system as the system has to be designed for worst case skew for it to operate reliably. The principle cause of clock skew in the global clock distribution of an integrated circuit system is the variation in the routing impedance of the clock distribution within the system. Hence clock skew arises within an individual integrated circuit die even with an equal length clock distribution network such as an H-Tree. A good rule of thumb in the industry is that clock skew budget is approximately 10% of the cycle time. Hence for a 1 GHz clock frequency, which corresponds to a 1 ns cycle time, the tolerable clock skew is less than or equal to 100 ps. As VLSI clock frequencies increase beyond 1 GHz, the requirement on the clock skew becomes even more challenging.

FIG. 1 is a block diagram of a system 101 having a plurality of dice including a processor 117 communicating with other dice including chip set 115 and memory 113. Input/output communications among processor 117, chip set 115 and memory 113 are clocked using external crystal oscillator 103. A clock signal 121 is generated by using external crystal oscillator 103, which is received by phase lock loop 105. Phase lock loop 105 generates a clock signal 123, which is received by the buffer circuits 107, 109 and 111. Buffer circuits 107, 109 and 111 generate clock signals 125, 127 and 129, which are all in phase with each other and are used to drive memory 113, chip set 115 and processor 117, respectively. A clock input of processor 117 is fed back to divide by N circuit 119 back into phase lock loop 105 to achieve the system level phase locking and clocking for processor 117, chip set 115 and memory 113.

FIG. 2 is a block diagram of some of the internal clocking elements of processor 117, which is illustrated in FIG. 1. As shown in FIG. 2, clock signal 129 is received by a phase lock loop circuit 201, which generates a clock signal 209 received by a synchronizer and divider 203. Synchronizer and divider 203 generates a divided clock output 210 and a clock signal 211, which is used to clock the logic of processor 117 through electrically routed H-tree 205, which will be described in greater detail below. Electrically routed H-tree 205 includes an output which is logically-AND'ed with divided clock output 210 of synchronizer 203 using logical-AND gate 207. An output of logical-AND gate 207 is fed back into phase lock loop 201. By using the clocking circuitry illustrated in FIG. 2, digital logic and input/output functions of processor 117 are phase locked and clocked for operation.

FIG. 3 is a diagram of the electrically routed H-tree 205 of FIG. 2. In today's global clock distribution networks, clock skew may be controlled with the use of electrical hierarchical H-trees. FIG. 3 is a diagram illustrating such a hierarchical H-tree clock distribution network 205 that is implemented in high-speed integrated circuits to reduce or eliminate a clock skew effect. As shown in FIG. 3 a clock signal 211 is used to drive electrical H-tree network 205 at the center node 301. It is noted that clock signal 211 is typically generated by a very large driver in order to provide sufficient drive to H-tree network 205, which typically has a large capacitance in today's complex high speed integrated circuits. As can be observed in FIG. 3, the clock pads of the "H" found between nodes 303A, 303B, 303C and 303D have equal lengths between center node 301 and each of the peripheral points of the "H" at nodes 303A, 303B, 303C and 303D. Therefore, assuming a uniform propagation delay of clock signal 211 per unit length of the H-tree network 205, there should be no clock skew between the clock signal 211 supplied to nodes 303A, 303B, 303C and 303D.

FIG. 3 further illustrates H-tree network 205 taken to another hierarchical level with a "H" coupled to each respective peripheral node of the first level "H." Accordingly, every peripheral node 303A–D is an equal distance from node 303A. Every peripheral node 307A–D is an equal distance from node 303B. Every peripheral node 309A–D is an equal distance from node 303C. Every peripheral node 311A–D is an equal distance from node 303D. Therefore, the clock paths to all of the peripheral clock receiver nodes 305A–D, 307A–D, 309A–D and 311A–D are an equal distance from the clock driver of clock signal 211 and therefore should have no clock skew between them because the clock delay from the clock driver of clock signal 211 should be equal to all peripheral nodes of the H-tree network 205. Thus, each clock receiver node 305A–D, 307A–D, 309A–D and 311A–D can be configured to act as a receiving station for clock signal 211 and service the clocking requirements of an area of the integrated circuit near the node with negligible clock skew with reference to the other similarly configured nodes of the H-tree network 205.

As integrated circuits continue to become larger, more complex and run at higher frequencies, clock skew continues to be a challenging issue, even with an electrical H-tree network 205 since H-tree network 205 clock lines do not always have uniform characteristic impedance. As a result, there may be a non-uniform propagation delay of a clock signal 211 travelling through the paths of H-tree network 205 even though clock receiver nodes 305A–D, 307A–D, 309A–D and 311A–D are an equal distance from the clock driver of clock signal 211. Consequently, there is an unpredictable clock skew at the end points of the H-tree clock distribution network 205.

In addition to clock skew, the clock distribution on the die consumes valuable routing resources in integrated circuits that could be better used for signals and thereby improve signal route ability. An additional concern integrated circuit designers must consider is that known global clock distribution networks also consume an increasing amount of integrated circuit die area as well as power.

SUMMARY OF THE INVENTION

A clock distribution network is described. In one embodiment, the clock distribution network includes a clock receiver node disposed in a first semiconductor die, the clock receiver node providing a first clock signal. The clock distribution network also includes a clock generation circuit disposed in the first semiconductor die. The clock generation circuit is coupled to the clock receiver node to generate a second clock signal in phase with the first clock signal to clock a second semiconductor die. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Methods and apparatuses for distributing a clock signal in a system are disclosed. The subject of the invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known or conventional details are not described in order not to obscure the present invention in detail.

The present invention provides in one embodiment a method and apparatus for distributing a clock signal through a system by bringing in optical clock signals through the back side of a semiconductor die, such as for example a processor, using a mode locked or modulated infrared or visible light laser and focusing the light into clock receiver nodes having photo receivers embedded in the integrated die circuitry through the semiconductor substrate. One embodiment of the present invention provides the advantage of employing optical techniques that can be used without disturbing conventional complementary metal oxide semiconductor (CMOS) process and controlled collapse chip connection (C4) packaging technology. The beam splitting and focusing elements utilized by one embodiment of the present invention may be fabricated into optical elements separate from the semiconductor substrate or optical wave guides may be deposited or micro-machined on to the back side of the semiconductor die. By providing an equal length path from the optical source of one embodiment of the present invention to the photo receivers of the clock receiver nodes, the portion of clock skew that arises in the global clock distribution network can be reduced with one embodiment of the present invention as clock frequencies continue to increase. By replacing the global clock distribution network in the semiconductor die with the presently described optical clock distribution network, chip area and chip power dissipation can also be saved. In addition, by freeing up the semiconductor die area formerly used for global clock routing, integrated circuit die sizes may be reduced. Since the clock distribution network is decoupled from the semiconductor and package with one embodiment of the present invention, the clock distribution becomes scaleable to take advantage of developments in optics technology.

Figure 1:
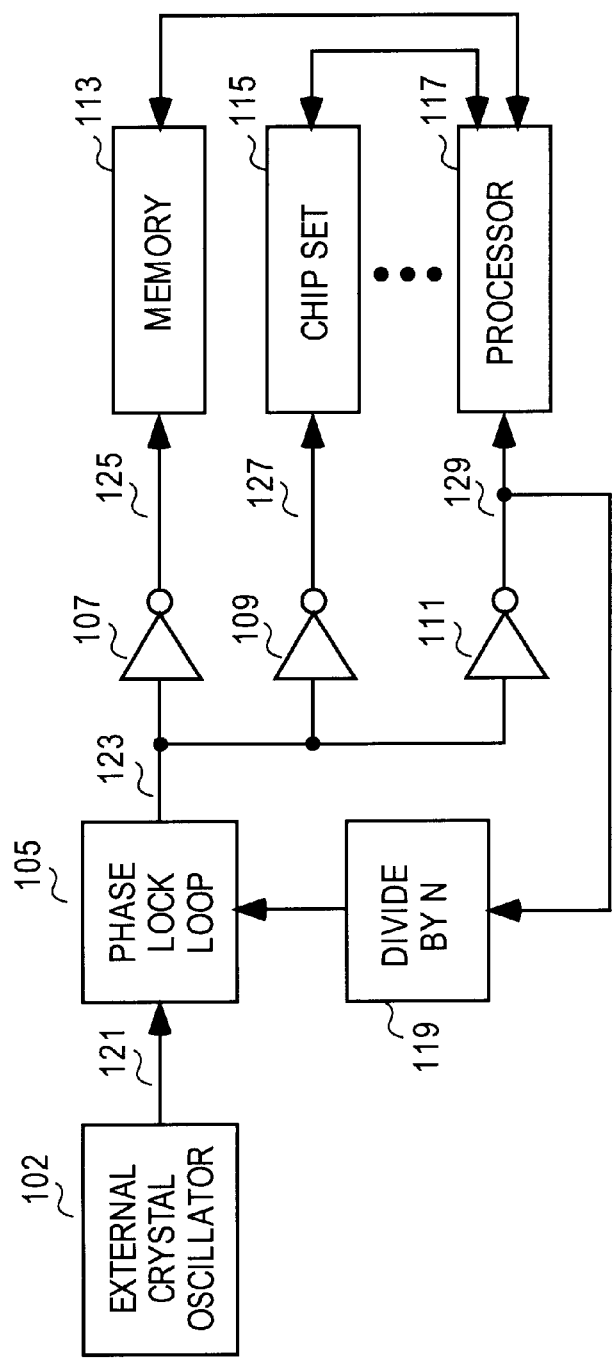
FIG. 1 is block diagram of a system having dice clocked with an external crystal oscillator.

By clocking the semiconductor die with the optical source of one embodiment of the present invention, external crystal oscillators as described in FIG. 1 above are no longer required to clock the semiconductor die. Assuming for example that the semiconductor die that is optically clocked in accordance with the teachings of one embodiment of the present invention is a processor, in order to run a complete system, one not only clocks the processor, but also the input/output communications between the processor and other dice in the system. Therefore, in one embodiment of the present invention, the semiconductor die that is optically clocked includes a clock generation circuit that generates in phase clock signals that other dice in the system can use to phase lock themselves with the processor. Thus, phase locked input/output communications among all of the dice in the system are enabled with one embodiment of the present invention.

Referring back to the optically clocked semiconductor die of one embodiment of the present invention, an off die optical source, which in one embodiment is an infrared laser, is configured as an optical clock to generate and emit infrared laser pulses at a desired clock frequency. In one embodiment, the semiconductor substrate of the semiconductor die to be optically clocked includes silicon. Since silicon is partially transparent to infrared light, the laser pulses may be configured to penetrate the silicon and may be focused into photo receivers, which in one embodiment include P-N junctions disposed within the silicon to create photocurrents. It is appreciated that heavily doped silicon is partially transparent to infrared radiation at a wavelength that is just around the silicon band gap. In particular, the band gap of intrinsic silicon at room temperature is 1.11 eV. Heavy doping causes the band gap to shrink by around 100 meV to 1.01 eV.

Figure 4:
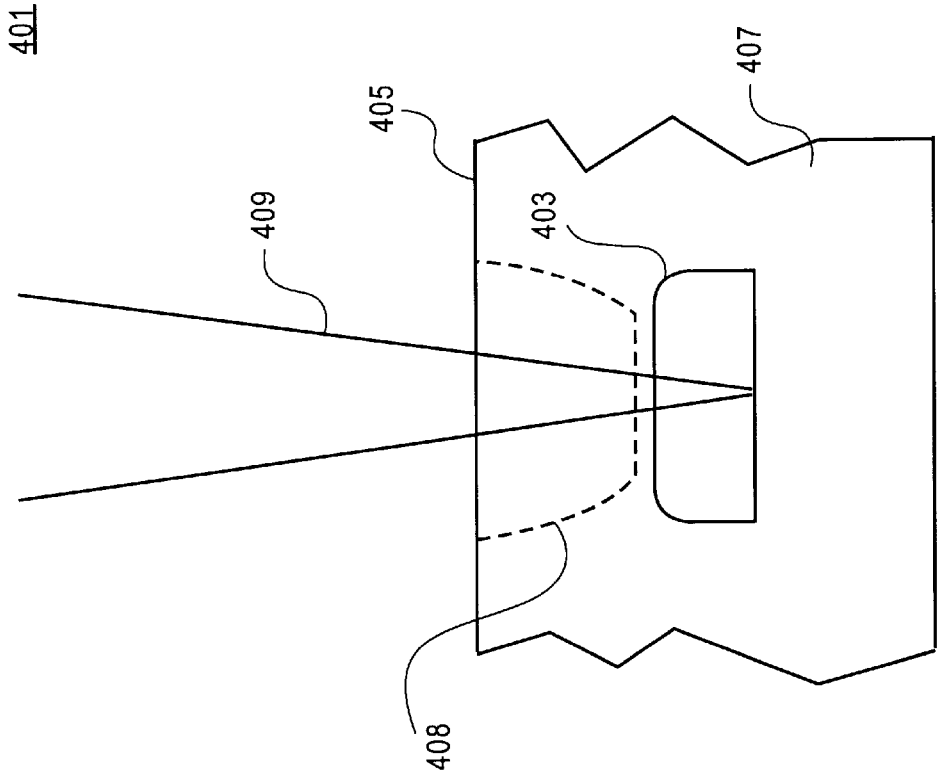
FIG. 4 is a diagram of an optical pulse being emitted into a photo receiver through a back side of a semiconductor die.

FIG. 4 shows a portion of one embodiment of a clock receiver node 401 in accordance with the teachings of one embodiment of the present invention. In one embodiment, clock receiver node 401 includes a photo diode 403 disposed in a semiconductor 407. In one embodiment, photo diode 403 includes a P-N junction, a PIN junction, or the like, and semiconductor 407 includes silicon. In one embodiment, semiconductor substrate 407 is accessible from the back side 405. Accessibility to the back side 405 of semiconductor substrate 407 is provided in one embodiment by including semiconductor substrate 407 as part of a C4 packaged integrated circuit. As a result, an infrared laser pulse 409 may be focused through back side 405 of semiconductor 407 into photo diode 403. As a result of the energy from laser pulse 409 being focused into photodiode 403, a photocurrent is produced that, as will be discussed, is converted into a voltage and ultimately a clock signal in accordance with the teachings of one embodiment of the present invention. In one embodiment, the laser pulse 409 is optically split and focused through back side 405 of semiconductor 407 into a number of similarly configured photo diodes 403.

In one embodiment, a Neodymium: Yttrium, Lithium Fluoride (Nd:YLF) laser is utilized, which generates photons with a wavelength of 1.054 μm, and an energy of approximately 1.178 eV. Accordingly, the Nd:YLF photons from the infrared laser can be transmitted through the silicon from the back side directly into photo receiver diodes, P-N junctions, PIN junctions or the like, embedded in the circuitry of a chip accessible from the back side. The laser radiation will penetrate the silicon and generate photocurrents in the photo diodes. In one embodiment of the present invention, the transmission of the photons of a laser having a wavelength of 1.06 μm has been measured to be approximately 1–2% through a substrate approximately 720 μm thick.

Figure 5:
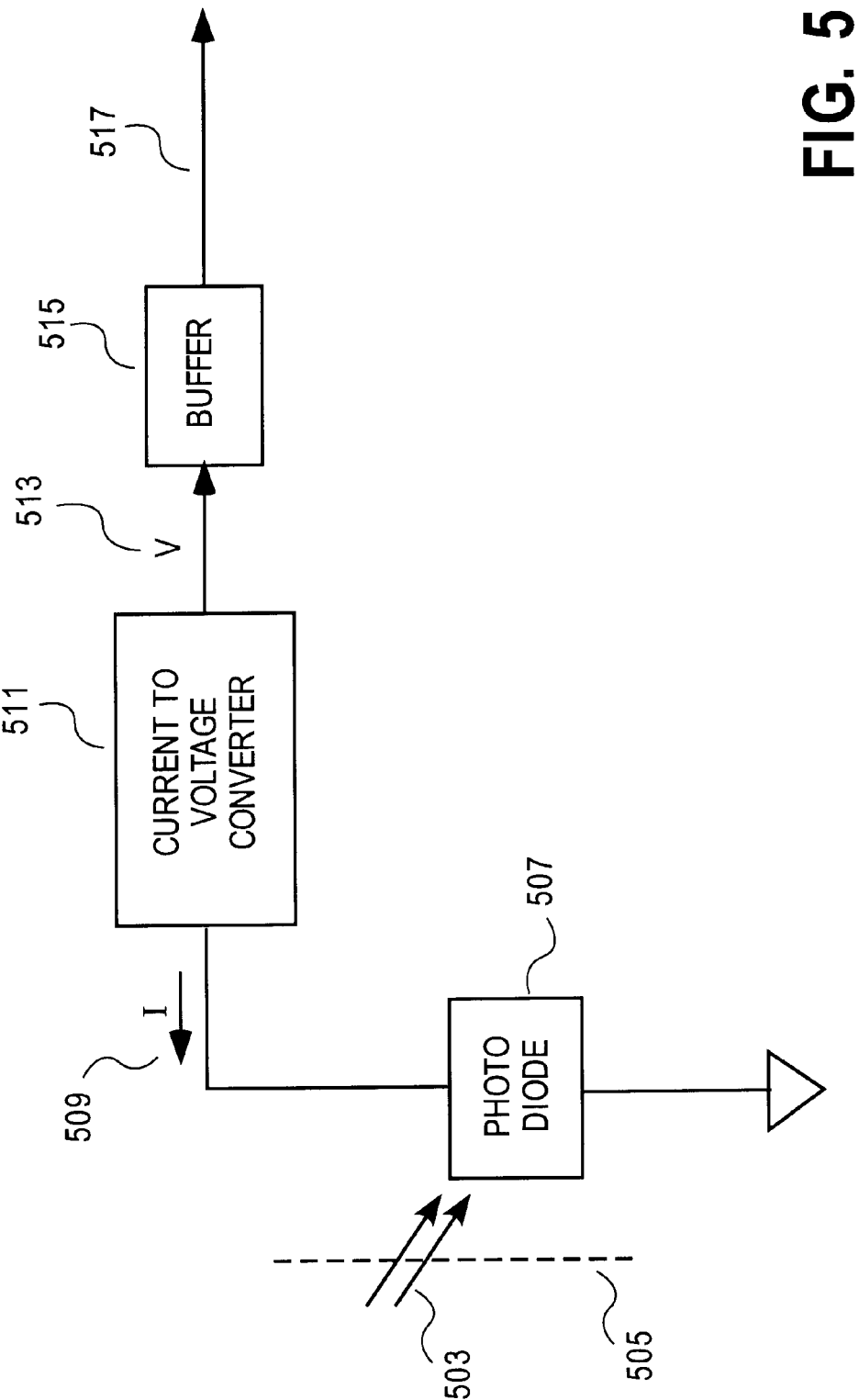
FIG. 5 is a block diagram of a photo receiver in accordance with the teachings of the present invention.

FIG. 5 is an illustration of another embodiment of a clock receiver node 501 in accordance with the teachings of one embodiment of the present invention. In one embodiment, clock receiver node 501 includes a photo diode 507 disposed in a semiconductor with an optical pulse 503 focused on photo diode 507 through the back side 505 of the semiconductor. As a result of the optical pulse 503, a photocurrent I 509 is generated. Current to voltage converter 511 converts photocurrent I 509 to a voltage V 513. Voltage V 513 is buffered with buffer 515 to generate clock signal 517. In one embodiment of the present invention, photo diode 507 is a P-N junction, PIN junction or the like disposed in the semiconductor. A plurality of photo receivers 501 may be distributed throughout an integrated circuit die to provide clock signal 517 to clock a designated area of the integrated circuit. In one embodiment of the present invention, clock signal 517 clocks an area of the integrated circuit near photo receiver 501. By having a plurality of clock receiver nodes 501 to generate clock signals 517, the clock can be optically distributed throughout the integrated circuit with low clock skew.

In one embodiment of the present invention, known circuit techniques are used to convert the light of optical pulse 503 to photocurrent I 509, to convert photocurrent I 509 to voltage V 513 and to buffer voltage V 513 to generate clock signal 517. In one embodiment, photo diode 507, current to voltage converter 511 and buffer 515 are optimized for sensitivity and jitter since it is appreciated that the actual clock skew is determined in part by the degree of matching of photo receivers 501 across the semiconductor die. In addition, it is noted that the amount of local buffering employed by each clock receiver node 501 impacts actual clock skew since each additional local buffering stage correspondingly introduces additional clock skew.

Figure 6:
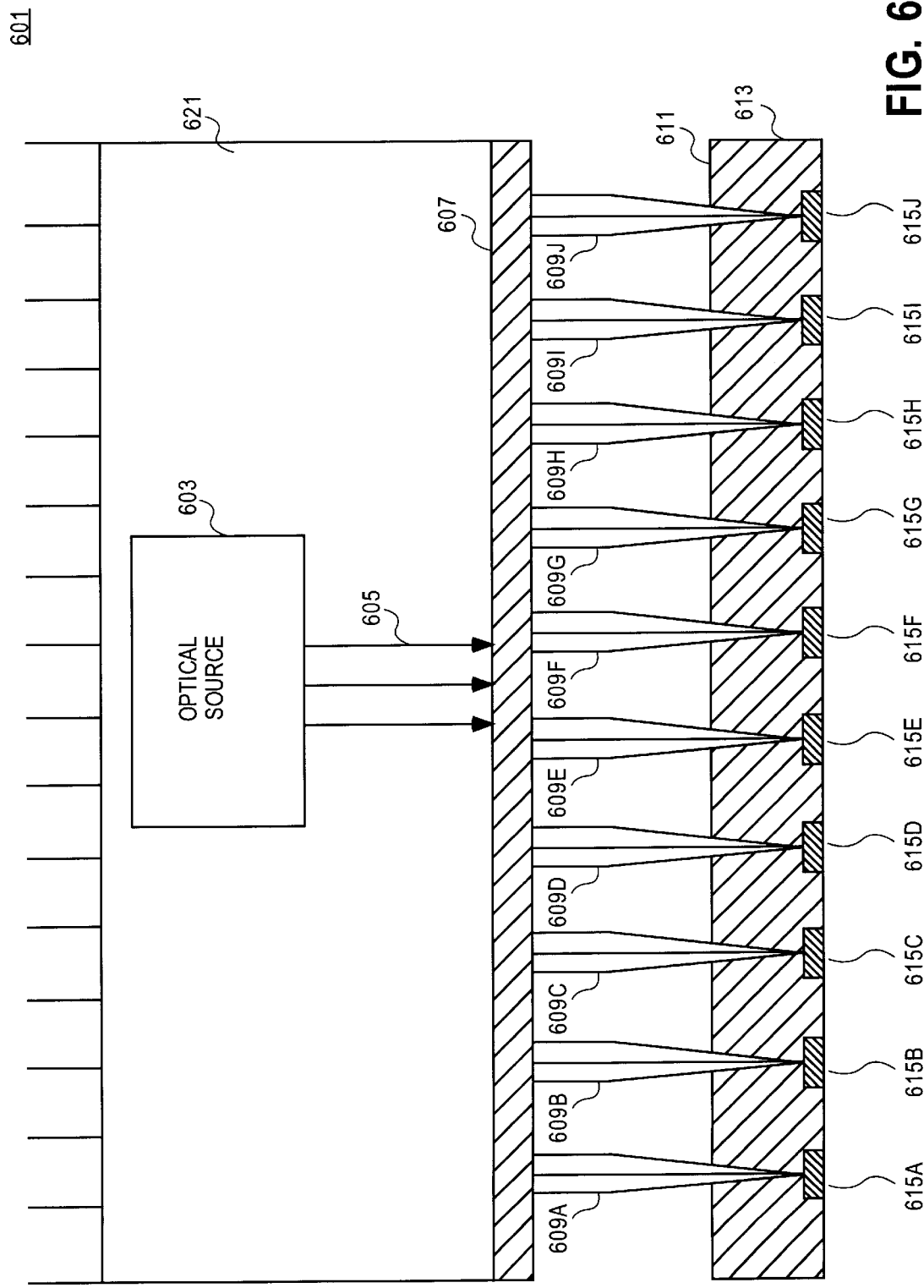
FIG. 6 is a side view diagram of a semiconductor die including a clock distribution network in accordance with the teachings of the present invention.

FIG. 6 is an illustration of a side view of one embodiment of a semiconductor die 613 utilizing an optical clock distribution network 601 in accordance with the teachings of one embodiment of the present invention. An optical source 603 is configured to emit master optical pulses 605 at a desired clock frequency. An optics element 607 receives master optical pulses 605 and generates split optical pulses 609A–J as shown in FIG. 6. In one embodiment of the present invention, optical element 607 uses well known techniques to split, collimate and focus split optical pulses 609A–J into clock receiver nodes 615A–J through the back side 611 of semiconductor die 613, which is accessible from the back side. In one embodiment, clock receiver nodes 615A–J include P-N junctions or other similar elements which convert light to photocurrent, as discussed above with respect to FIGS. 4 and 5. Accordingly, a separate clock signal may be generated by each clock receiver node 615A–J and may therefore be used to clock a specific area of circuitry in the integrated circuit of semiconductor die 613.

Figure 2:
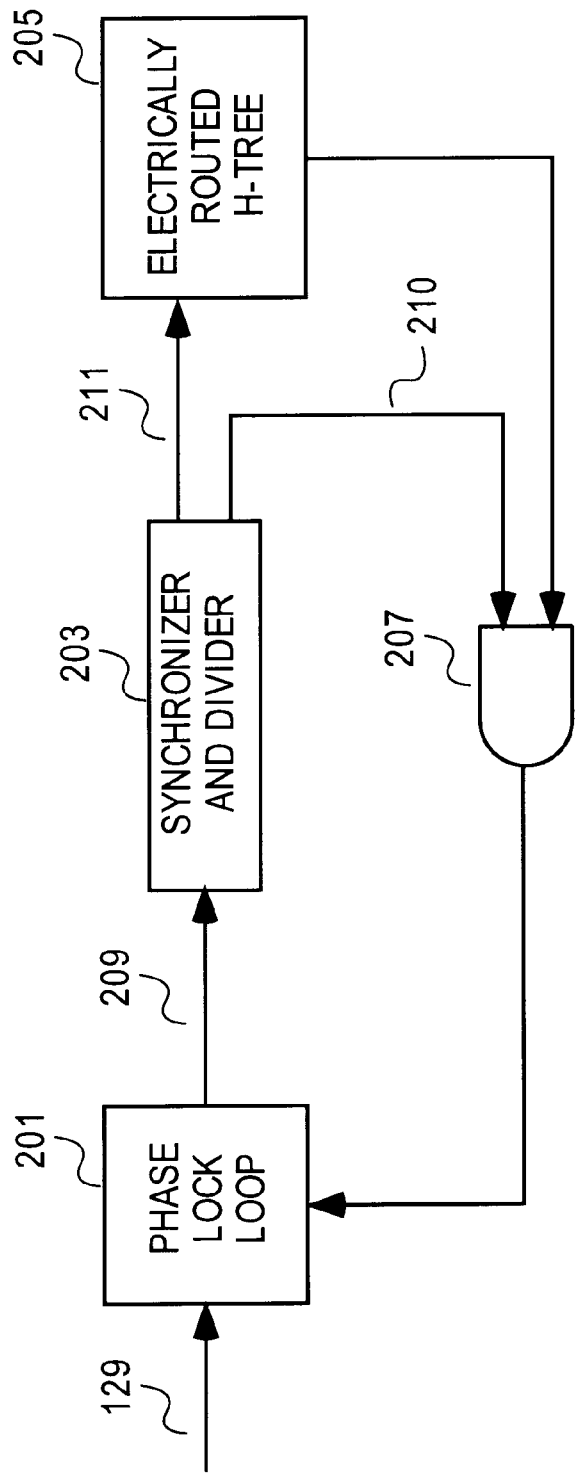
FIG. 2 is a block diagram of clocking elements of a processor.
Figure 3:
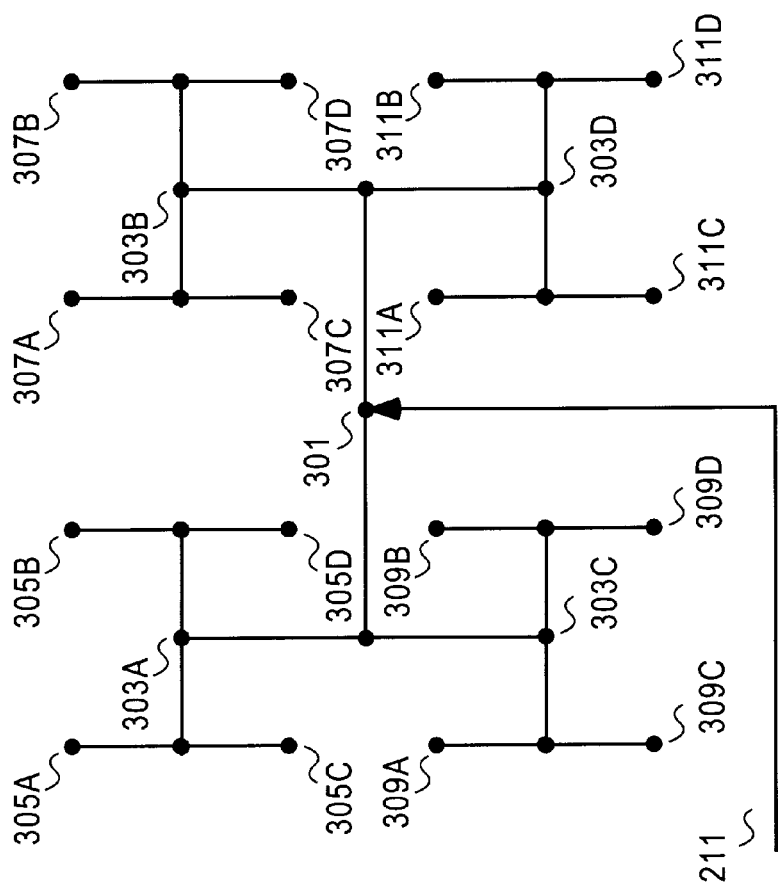
FIG. 3 is an illustration of an electrical hierarchical H-tree clock distribution network.

As can be appreciated in FIG. 6, the clock of the integrated circuit is optically distributed throughout semiconductor die 613 thereby removing the clock distribution network from semiconductor die 613 and thus eliminating the problems associated with the known clock distribution networks such as for example the electrical H-tree clock distribution network 205 discussed in FIGS. 2 and 4 above.

In one embodiment of the present invention, the path lengths of master optical beam 605 through split optical beams 609A–J into photo receivers 615A–J are all equal in length to reduce any clock skew between each photo receiver 615A–J. In another embodiment, controlled skew is achieved with the present invention by deliberately delaying an optical signal by implementing a longer optical path length within optical element 607.

In one embodiment, optical source 611 is included in, compatible with or integrated with heat sink 621, which in one embodiment is thermally coupled to back side 611 of semiconductor die 613 to dissipate heat. In one embodiment, optical element 607 includes diffractive optics or other elements to split master optical pulses 605 to generate split optical pulses 609A–J. In one embodiment, optics element 607 is integrated into heat sink 621. In another embodiment, optics element 607 is sandwiched between heat sink 621 and back side 611 of semiconductor die 613. In still another embodiment, optics element 607 is integrated into back side 611 of semiconductor die 613. In yet another embodiment of the present invention, optical element 607 is optically coupled to optical source 603 with an optical fiber. Therefore, optical source 603 is not necessarily limited to being included within heat sink 621 and therefore may be included in a separate package from the integrated circuit chip.

As discussed above, optics element 607 splits, collimates and focuses optical beams 609A–J into clock receiver nodes 615A–J using known techniques. In one embodiment, optics element 607 includes a fiber optic system employed to split the power of optical beam 605 and distribute and focus split optical beams 6095A–J into clock receiver nodes 615A–J. This embodiment includes individual micro-lenses at the ends of the fiber optic elements and any required matching of the semiconductor/air refractive index to improve the light coupling into the semiconductor.

In another embodiment, a computer generated hologram may be used as optics element 607 to generate each split laser beam 609A–J. In yet another embodiment of the present invention, optics element 607 includes etch phase hologram gratings directly on the back side 611 of semiconductor substrate 613 for splitting and focusing the master optical pulses 605. This embodiment has the advantage of self aligning the fan-out beams of the receivers to the accuracy of the lithographic registration of the manufacturing process used. In another embodiment of the present invention, optics element 607 includes wave guides fabricated from glass or a polymeric material on the semiconductor back side 611 to split, bend, collimate and focus optical beams 609A–J into clock receiver nodes 615A–J.

Figure 7:
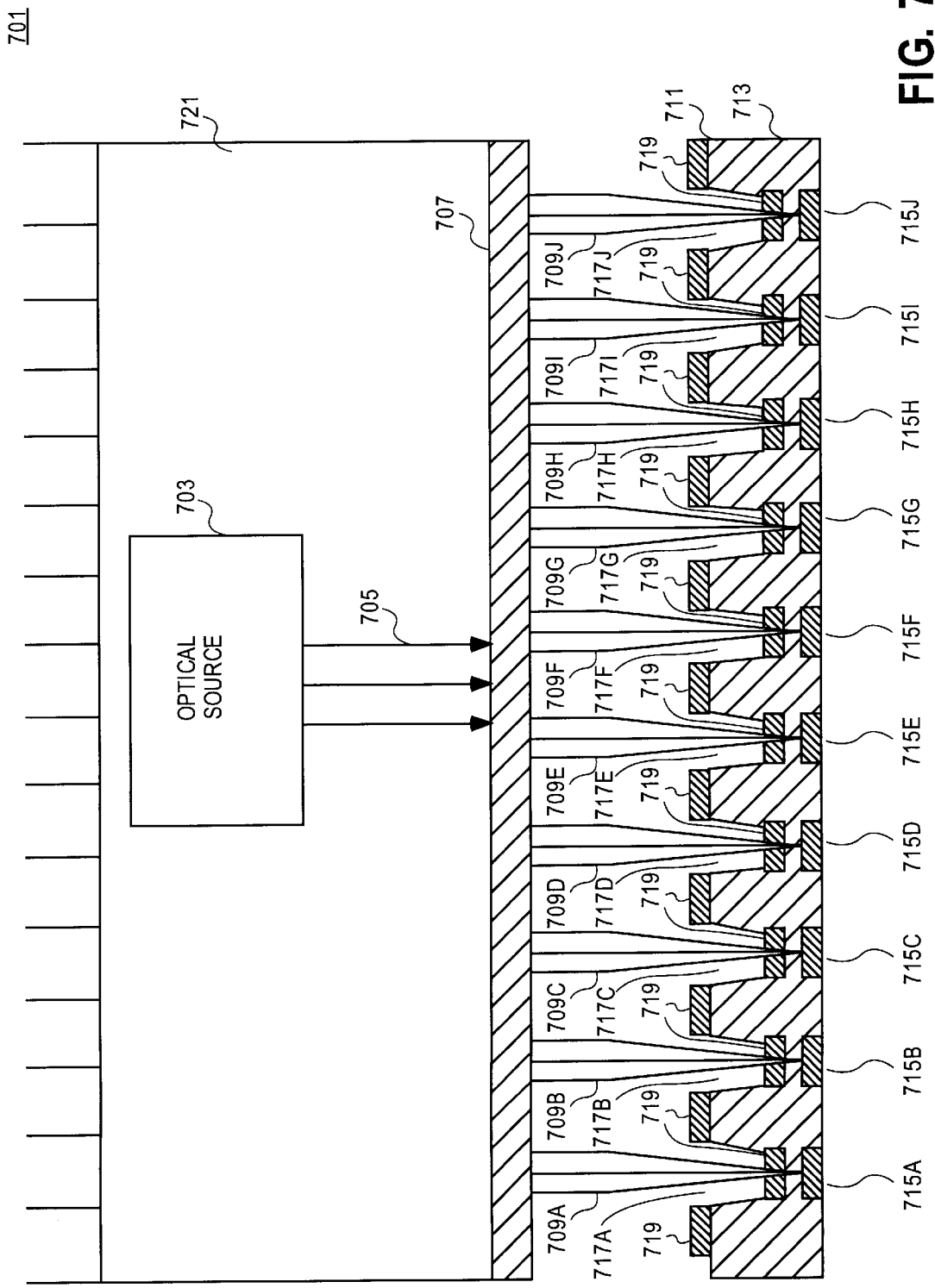
FIG. 7 is a side view diagram of another embodiment of a semiconductor die including a clock distribution network in accordance with the teachings of the present invention.

FIG. 7 is an illustration of a side view of another embodiment of a semiconductor die 713 included in an optical clock distribution network 701, in accordance with the teachings of the present invention. Optical source 703 is configured to emit master optical pulses 705 at a desired clock frequency into optics element 707, which splits master optical beam 705 into split optical beams 709A–J. To reduce the attenuation that occurs in the split optical beams 709A–J after penetrating back side 711 of semiconductor die 713, recesses 717A–J have been added to semiconductor die 713 on the back side 711 to locally thin the semiconductor die 713 disposed between the clock receiver nodes 715A–J and optical source 703. As a result, split optical beams 709A–J do not travel through as much semiconductor material in comparison with the optical distribution network 601 shown in FIG. 6. Thus, the amount of attenuation of split optical beams 709A–J before reaching clock receiver nodes 715A–J is reduced and optical beam transmission is improved into each clock receiver node 715A–J. In one embodiment, recesses 717A–J may be micromachined or milled using well known techniques such as for example an anisotropic wet etch or any other techniques used to form trenches, vias or the like in today's integrated circuits.

In addition, it is noted that the passage of split optical beams 709A–J through semiconductor substrate 713 results in the generation of electron-hole pairs in semiconductor substrate 713 proximate to clock receiver nodes 715A–J. The generation of these electron-hole pairs may decrease the speed of diodes included in photo receivers 715A–J. By forming recesses 717A–J and reducing the amount of semiconductor substrate 713 through which optical beams 709A–J travel to reach clock receiver nodes 715A–J, the number of electron-hole pairs generated by light passing through semiconductor substrate 713 is reduced accordingly. By reducing the number of electron-hole pairs being generated, the speed of diodes included in clock receiver nodes 715A–J is maintained.

Another technique used to increase the efficiency of split optical beams 709A–J reaching photo receivers 715A–J is to reduce the amount of optical power reflected off back side 711 of semiconductor die 713. One embodiment of the present invention includes an anti-reflective coating 719, which is disposed on the back side 711 of semiconductor die 713. With anti-reflective coating 719 on the back side 711 of semiconductor die 713, the amount of energy reflected off back side 711 of semiconductor die 713 is reduced resulting in an improved optical coupling into semiconductor die 713. By using techniques such as the application of anti-reflective coating 719 and the milling of semiconductor die 713 above each clock receiver node 715A–J to form recesses 717A–J, the amount of optical energy applied to each clock receiver node 715A–J is increased resulting in higher efficiency of optical clock distribution network 701.

In another embodiment of the present invention, referring back to FIG. 4, optical pulse 409 is not limited to being an infrared laser. In that embodiment, a substantial portion 408 of semiconductor 407 is milled away to form a trench or recess such that optical pulse 409 is not required to penetrate more than approximately 0.2–1.0 $\mu$ms of semiconductor material (depending on the precise wavelength used) before reaching photo diode 403. With most of the portion 408 removed from semiconductor 407, a visible (approximately 0.4–0.7 $\mu$ms) or near infrared (approximately 0.7–1.0 $\mu$ms) optical pulse 409 may be directly focused from back side 405 of semiconductor 407 into photo diode 403 to generate photocurrent in accordance with the teachings of one embodiment of the present invention. By keeping the approximately 0.2–1.0 $\mu$ms of semiconductor material, photo diode 403 is kept intact.

One advantage in using a visible or a near infrared source for optical beam 409 is improved optical to electrical conversion efficiency in the photo receiver 403. This is because the photon energy for visible and near infrared parts of the spectrum is much higher than in the infrared (wavelength$\geq$1.1 $\mu$ms) part of the spectrum and the light absorption in photo diodes is more efficient ($\lambda \times e = 1.24$, where $\lambda$ is the photon energy in $\mu$ms and e is the photon energy in electron volts). This also means that less optical power is required with a visible source as compared to an infrared source. The 0.2–1.0 $\mu$ms of semiconductor material remaining after milling as shown in FIG. 4 ensures that a P-N junction or the like is present in the photo diode while reducing the optical attenuation through the semiconductor material.

For example, optical beams with photon energies higher than the silicon band gap are attenuated exponentially as they pass through the silicon. The characteristic attenuation becomes larger as the wavelength is reduced. However, when the thickness of the silicon is as small as 0.2–1.0 $\mu$ms, the attenuation is negligible. For near infrared operation, the remaining silicon thickness can be up to 1.0 $\mu$m without significant attenuation. For visible operation, the remaining silicon thickness should be in the 0.2 $\mu$m region. In one embodiment, the trench or recess is back filled with material that is transparent to visible or near infrared radiation in order to protect the exposed photo receivers with this arrangement.

Figure 8:
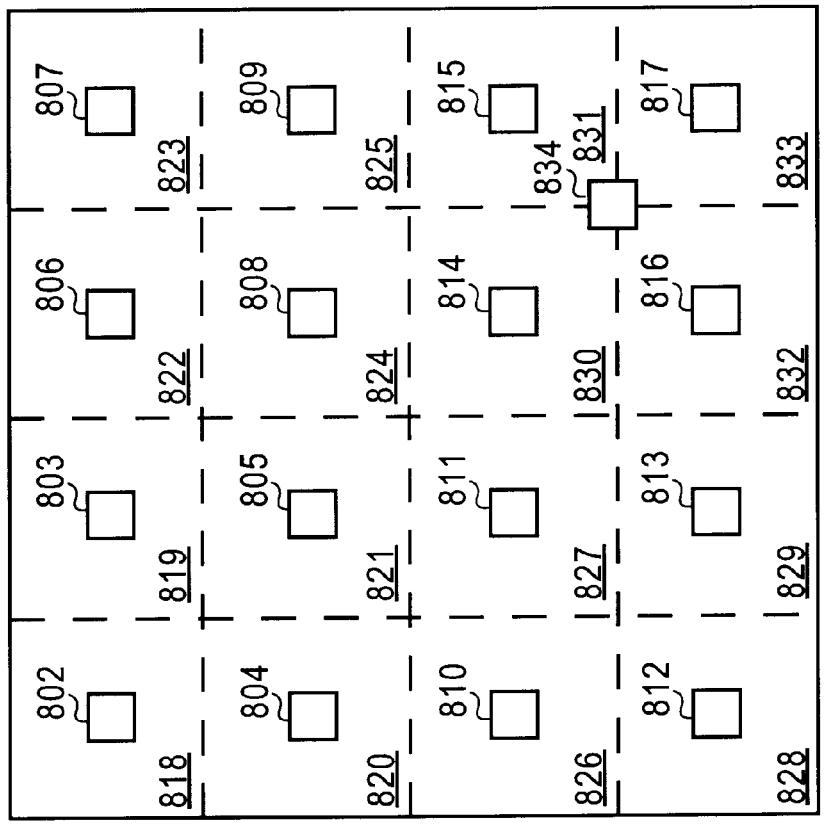
FIG. 8 is a top view diagram of a semiconductor die having a clock distribution network in accordance with the teachings of the present invention.

FIG. 8 is a top view diagram of an integrated circuit die 801 utilizing a clock distribution network in accordance with the teachings of one embodiment of the present invention. Integrated circuit die 801 includes a plurality of clock receiver nodes 802–817 distributed throughout the areas of integrated circuit die 801 that are clocked. In one embodiment, each clock receiver node 802–817 is configured to receive optical pulses through the back side of the semiconductor substrate of integrated circuit die 801. In one embodiment, each clock receiver node 802–817 is configured to clock the local area of integrated circuit die 801 in which each respective clock receiver node 802–817 is disposed. For instance, as shown in FIG. 8, clock receiver node 802 is configured to clock area 818 of integrated circuit die 801. Similarly, clock receiver node 803 is configured to clock area 819 of integrated circuit die 801, etc. Therefore, clock skew is reduced as compared to prior approaches since no clock receiver node 802–817 is configured to clock an area of integrated circuit die 801 that is relatively far away from each respective clock receiver node 802–817.

For example purposes only, clock receiver nodes 802–817 are arranged in FIG. 8 as a four by four array. It is appreciated that other arrangements of clock receiver nodes may be implemented in accordance with the teachings of one embodiment of the present invention. In addition, it is noted that there is a trade off in determining the total number of clock receiver nodes to distribute over an area of integrated circuit die 801. In particular, the more clock receiver nodes that are distributed over integrated circuit die 801, the less the clock skew there is for the particular area being clocked. Taken to an extreme, an individual clock receiver node could be provided for each clock node in integrated circuit die 801. However, as the total number of clock receiver node increases, a correspondingly increased amount of power is needed from the optical source because more split optical pulses will be needed to clock each clock receiver node. Therefore, in one embodiment of the present invention, integrated circuit designers determine the amount of clock skew tolerable for a particular integrated circuit die and the clock speed at which the integrated circuit die will be clocked to determine a desired number of clock receiver nodes to distribute over the area of the integrated circuit die.

As discussed above, clock receiver nodes 802–817 are configured in one embodiment to clock areas 818–833, respectively. In one embodiment, integrated circuit die 801 includes an additional clock receiver node 834, as shown in FIG. 8. In one embodiment, clock receiver node 834 is used to generate in phase clock signals that will be used to phase lock input/output communications between integrated circuit die 801 and other integrated circuit dice in a system that are not clocked directly with optical pulses.

Figure 9A:
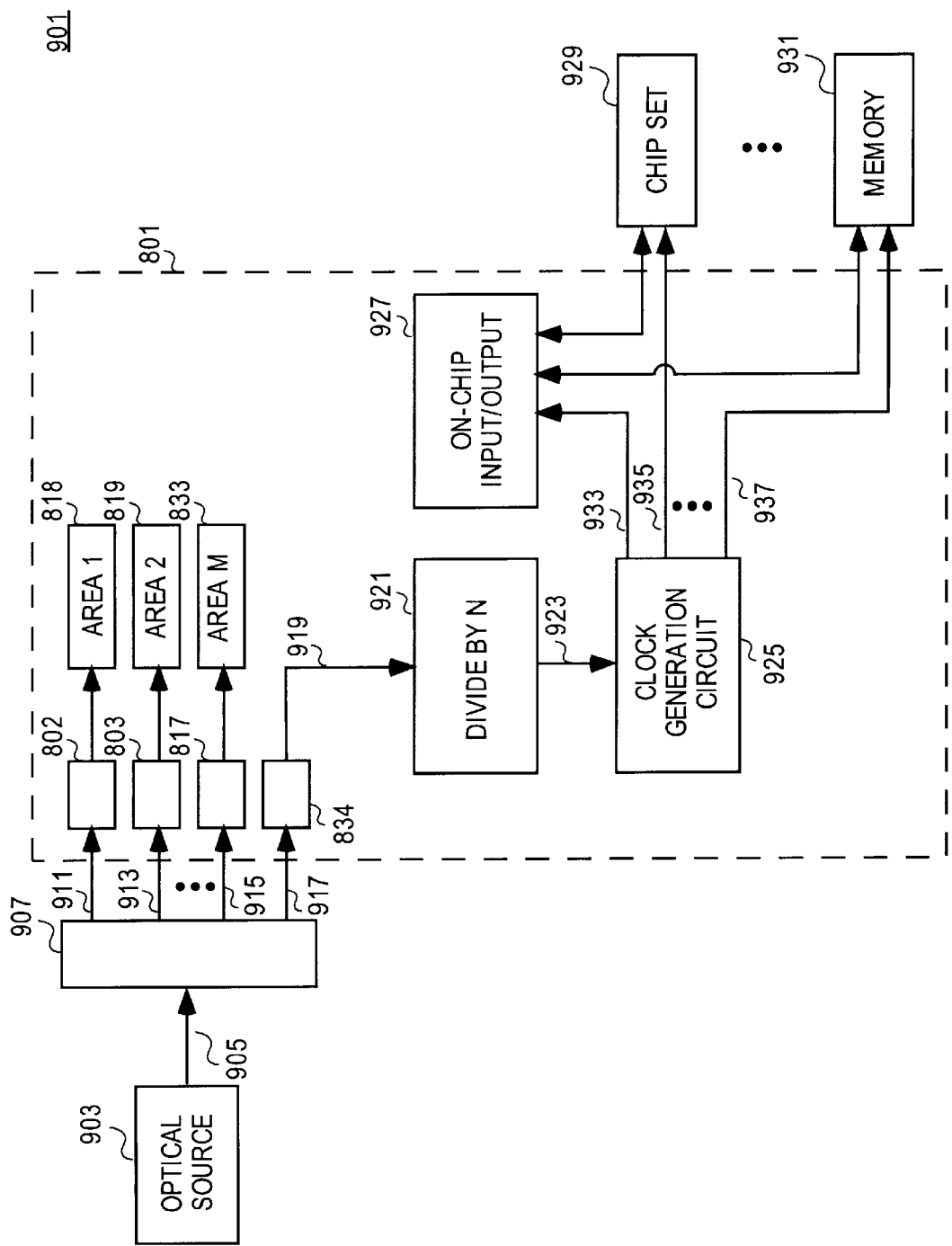
FIG. 9A is a block diagram of one embodiment of a system having dice utilizing a clock distribution network in accordance with the teachings of the present invention.

FIG. 9A is a block diagram of one embodiment of a clock distribution network 901 in a system in accordance with the teachings of the present invention. Unlike system 101 illustrated in FIG. 1, the optical clock distribution network 901 illustrated in FIG. 9A utilizes optical source 903 instead of an external crystal oscillator 103 to generate clock pulses. In one embodiment, optical source 903 generates a master optical clock pulse 905 at a clock frequency. Optical element 907 splits master optical clock pulse 905 into split optical clock pulses, including optical clock pulses 911, 913, 915 and 917. Split optical clock pulses 911, 913, 915 and 917 are received by semiconductor die 801. In one embodiment, split optical clock pulses 911, 913, 915 and 917 are received through a back side of the substrate of semiconductor die 801. In another embodiment, split optical clock pulses 911, 913, 915 and 917 are received through a front side of the substrate of semiconductor die 801. In one embodiment, semiconductor die 801 is a processor. Split optical clock pulse 911 is received by clock receiver node 802 to clock a first area 818 of integrated circuit die 801. Split optical clock pulse 913 is received by clock receiver node 803 to clock a second area 819 of integrated circuit die 801. Split optical clock pulse 915 is received by clock receiver node 817 to clock an Mth area 833 of integrated circuit die 801. Therefore, assuming integrated circuit die 801 is divided M areas 818–833, each respective area 818–833 is clocked with split optical clock pulses 802–817 respectively.

As shown in FIG. 9A, an additional clock receiver node 834 receives split optical clock pulse 917. In one embodiment, clock signal 919 generated with clock receiver node 834 is used to clock and phase lock the input/output communications between integrated circuit die 801 and other integrated circuit dice in the system including for example but not limited to chip set 929 and memory 931. As shown in FIG. 9A, a clock generation circuit 925 receives a clock signal 919 from clock receiver node 834. In one embodiment, clock receiver node 834 generates clock signal 919, which is divided by N to produce a clock signal suitable for input/output operations between integrated circuit die 801 and other integrated circuit dice in the system including chip set 929 and memory 931. In one embodiment, divide by N circuit 921 receives clock signal 919 and generates a clock signal 923 having a frequency suitable for input/output communications. In one embodiment, known circuit techniques are utilized in divide by N circuit 921 to divide clock signal 919 into signal 923 without adding significant delay. In one embodiment, divide by N 921 is a zero delay divide by N circuit.

As shown in FIG. 9A, clock signal 923 is received by clock generation circuit 925 and in phase clock signals 933, 935 and 937 are generated. In one embodiment, clock signals 933, 935 and 937 have the same phase as clock signal 923. Stated differently, clock outputs 933, 935 and 937 have substantially zero skew relative to clock signal 923. In one embodiment, clock signal 933 is used to clock on-chip input/output circuit 927 of semiconductor die 801. Clock signal 933 is used to clock an external semiconductor die such as for example chip set 929. Clock signal 937 is used to clock another external semiconductor die, such as for example memory 931. It is appreciated that in the event there are additional integrated circuit dice in the system, additional in phase clock signals may be generated by clock generation circuit 925. In one embodiment, if there are a fewer number of external dice that are clocked by clock generation circuit 925, then a fewer number of clock signals are generated by clock generation circuit 925. Therefore, input/output communications between on chip input/output circuit 927 of semiconductor die 801 and chip set 929 and memory 931 are phase locked to achieve increased reliability.

Figure 9B:
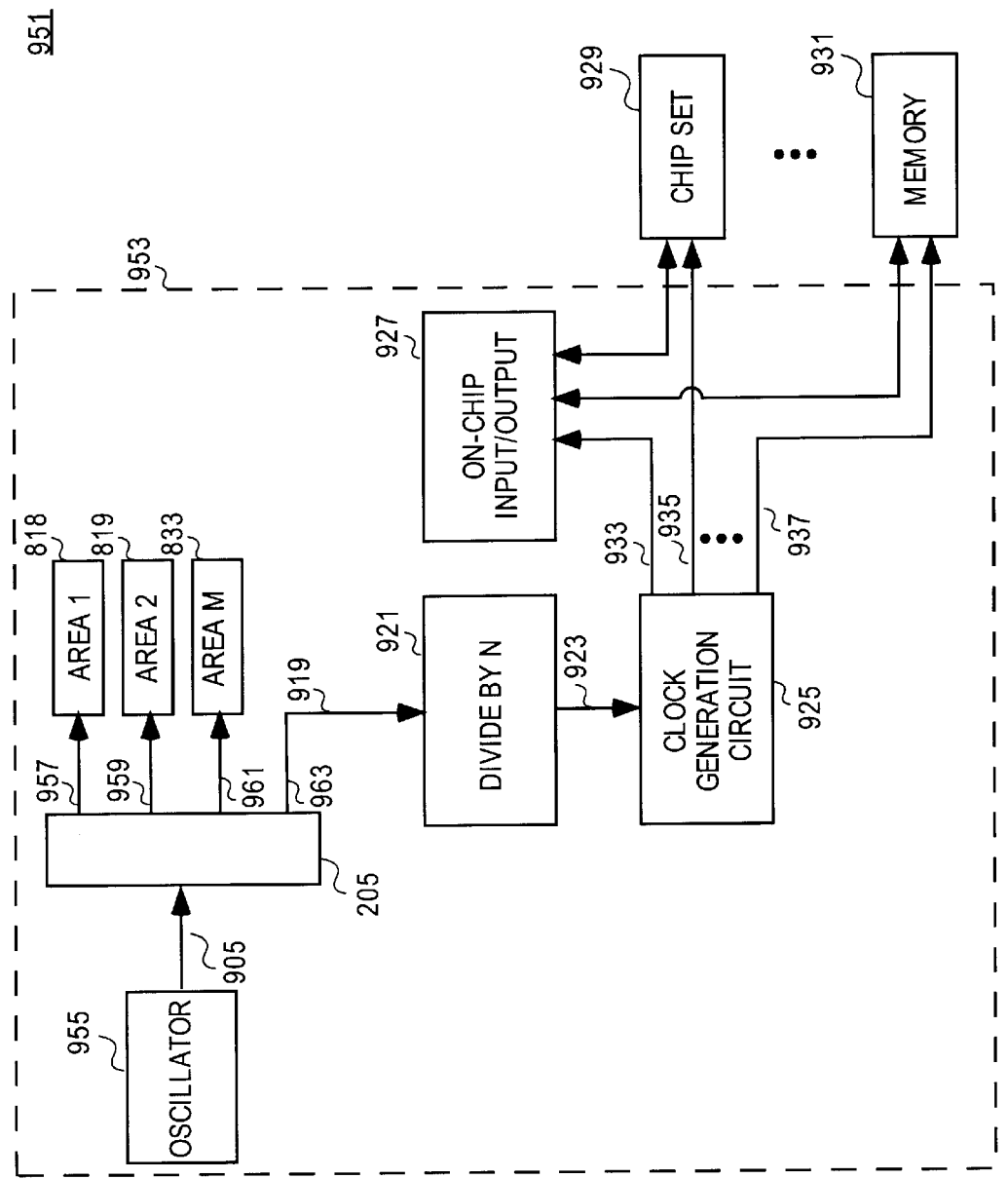
FIG. 9B is a block diagram of another embodiment of a system having dice utilizing a clock distribution network in accordance with the teachings of the present invention.

FIG. 9B is a block diagram of another embodiment of a clock distribution network 951 in a system in accordance with the teachings of the present invention. In one embodiment, optical source 903 generates a master optical pulse 905 at a clock frequency. In one embodiment, clock distribution network 951 includes a semiconductor die including an oscillator 955 to electrically clock the clock distribution network 951. In one embodiment, an H-tree network 205 is coupled to receiver clock pulses from oscillator 951 to distribute a clock pulses to clock receiver nodes 957, 959, 961 and 963 of semiconductor die 953. In one embodiment, a first area 818 of integrated circuit die 953 is clocked from clock receiver node 957, a second area 819 is clocked from clock receiver node 959 and an Mth area 833 is clocked from clock receiver node 961. Therefore, assuming integrated circuit die 953 is divided M areas 818–833, each respective area 818–833 is clocked by oscillator 955.

As shown in FIG. 9B, clock receiver node 963 provides a clock signal 919 to clock and phase lock the input/output communications between integrated circuit die 953 and other integrated circuit dice in the system including for example but not limited to chip set 929 and memory 931. As shown in FIG. 9B, a clock generation circuit 925 receives a clock signal 919 from clock receiver node 963, which is divided by N to produce a clock signal suitable for input/output operations between integrated circuit die 953 and other integrated circuit dice in the system including chip set 929 and memory 931. In one embodiment, divide by N circuit 921 receives clock signal 919 and generates a clock signal 923 having a frequency suitable for input/output communications. In one embodiment, known circuit techniques are utilized in divide by N circuit 921 to divide clock signal 919 into signal 923 without adding significant delay. In one embodiment, divide by N 921 is a zero delay divide by N circuit.

As shown in FIG. 9B, clock signal 923 is received by clock generation circuit 925 and in phase clock signals 933, 935 and 937 are generated. In one embodiment, clock signals 933, 935 and 937 have the same phase as clock signal 923. In one embodiment, clock signal 933 is used to clock on-chip input/output circuit 927 of semiconductor die 953. Clock signal 933 is used to clock an external semiconductor die such as for example chip set 929. Clock signal 937 is used to clock another external semiconductor die, such as for example memory 931. It is appreciated that in the event there are additional integrated circuit dice in the system, additional in phase clock signals may be generated by clock generation circuit 925. In one embodiment, if there are a fewer number of external dice that are clocked by clock generation circuit 925, then a fewer number of clock signals are generated by clock generation circuit 925.

Figure 10:
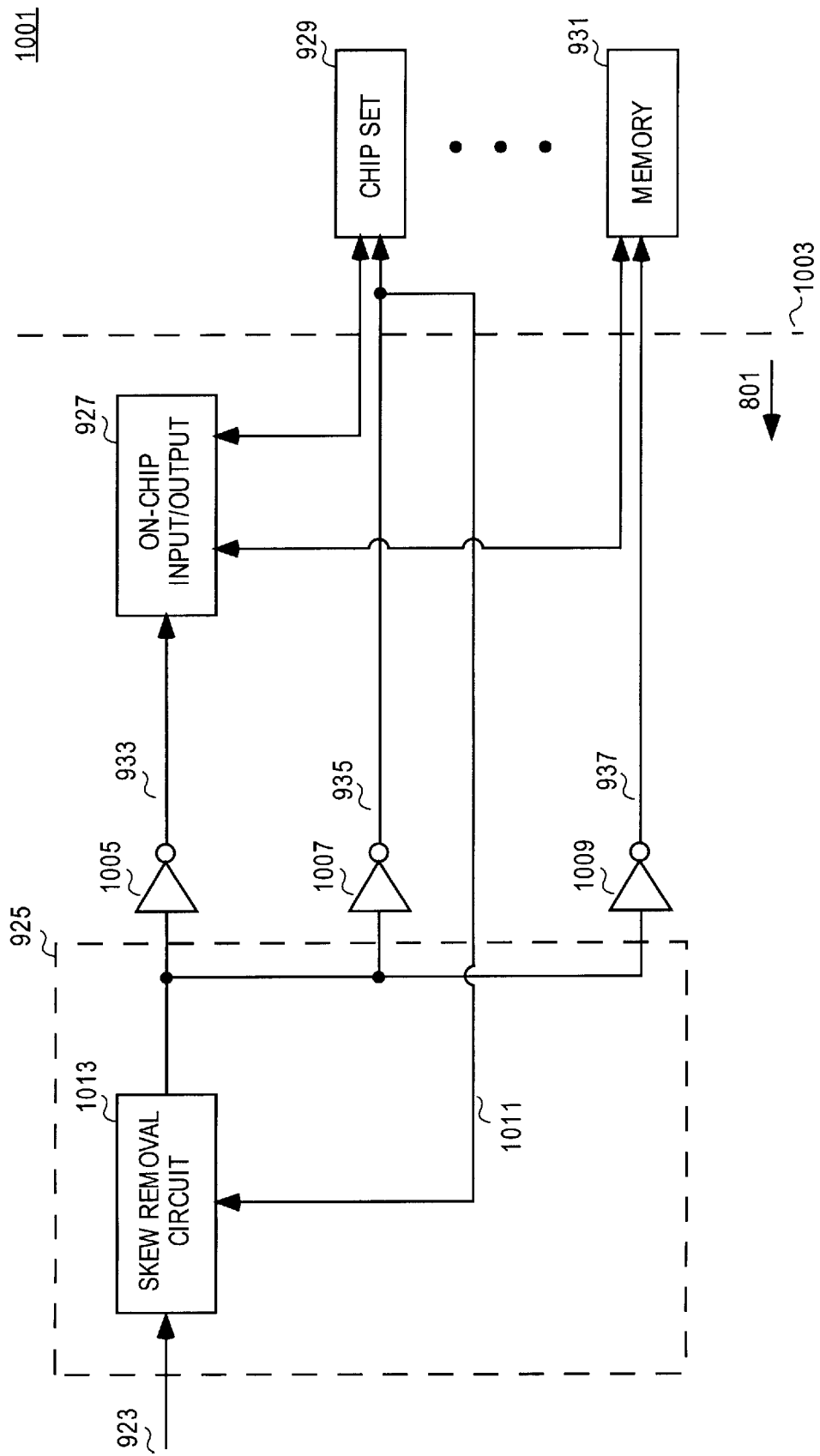
FIG. 10 is a block diagram of one embodiment of a clock generation circuit in accordance with the teachings of the present invention.

FIG. 10 is a block diagram of one embodiment of clock generation circuit 925. In particular, FIG. 10 shows a system 1001 including clock generation circuit having a skew removal circuit 1013. Skew removal circuit 1013 receives clock signal 923 and generates an output clock signal received at inputs of buffers 1005, 1007 and 1009. The output of buffer 1005 is clock signal 933, which is received by on chip input/output circuit 927. The output of buffer circuit 1007 is clock signal 935, which is received by chip set 929. The output of buffer circuit 1009 is clock signal 937, which is received by memory 931. As shown in FIG. 10, the elements that are to the right of dashed line 1003 are external to integrated circuit die 801 of FIGS. 8 and 9A–B. In one embodiment, the elements in FIG. 10 that are to the left of dashed line 1003 are included in integrated circuit die 801 of FIGS. 8 and 9A–B. As shown in FIG. 10, a clock input of chip set 929 is fed back into semiconductor die 801 as signal 1011 to an input of skew removal circuit 1013. In one embodiment, skew removal circuit 1013 compares clock signal 923 with feedback signal 1011 and removes phase differences between clock signal 923 and feedback signal 1011 using well known techniques when generating the output clock signal received by buffers 1005, 1007 and 1009.

In one embodiment, skew removal circuit 1013 is implemented using known techniques as a phase lock loop (PLL) circuit, or as a delay lock loop circuit (DLL), or the like, to remove skew between clock signal 923 and feedback signal 1011. Skew removal circuit 1013 is used to remove the skew between clock signal 923 and feedback signal 1011 such that clock signals 933, 935 and 937 are phase locked with clock signal 923 with substantially no clock skew between these signals.

Figure 11:
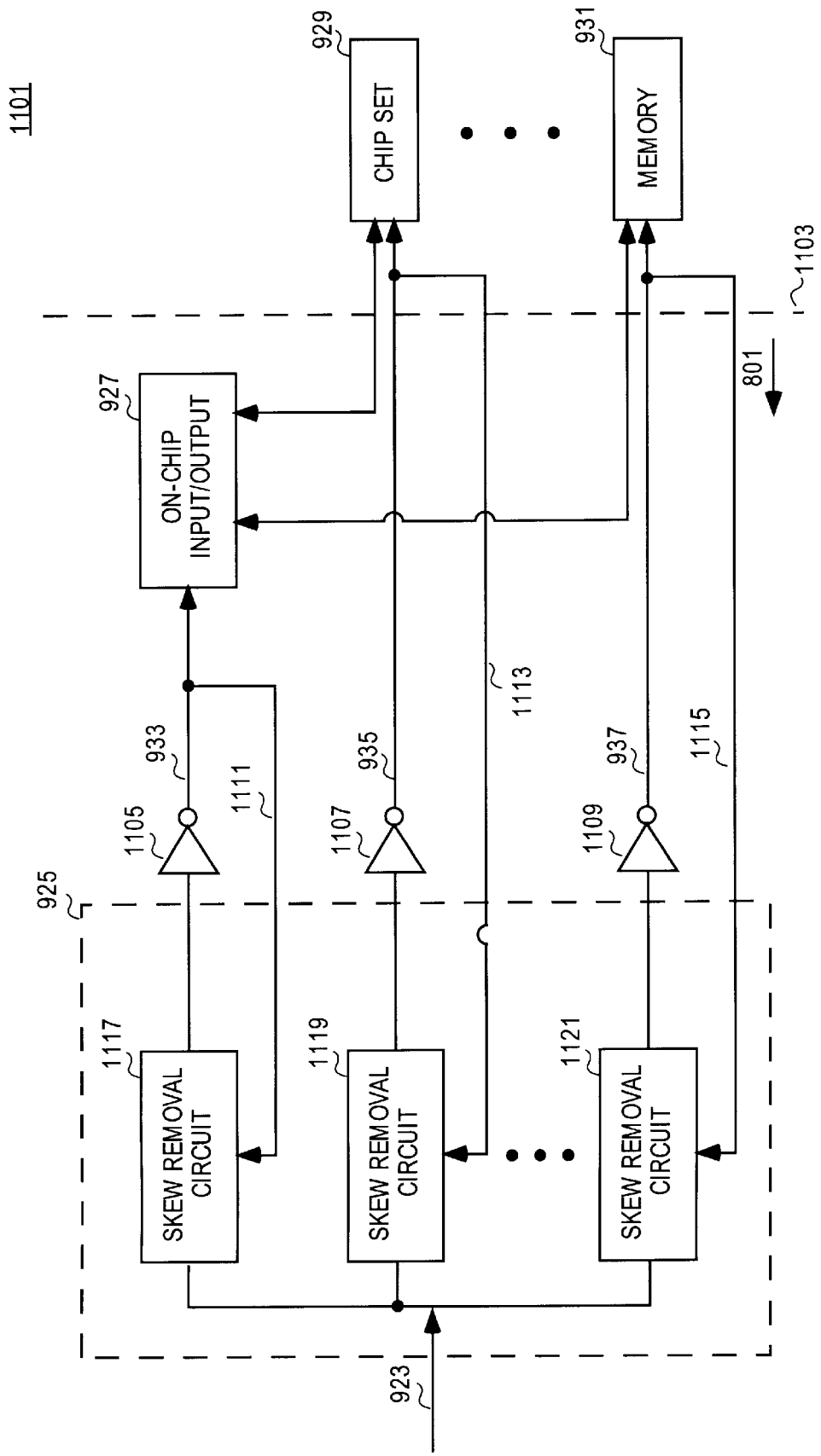
FIG. 11 is a block diagram of another embodiment of a clock generation circuit in accordance with the teachings of the present invention.

FIG. 11 is a block diagram of another embodiment of clock generation circuit 925 in accordance with the teachings of the present invention. As shown in FIG. 11, clock generation circuit 925 includes a plurality of skew removal circuits 1117, 1119 and 1121. As shown in FIG. 11, elements that are to the left of dashed line 1103 are included in semiconductor die 801. Elements that are to the right of dashed line 1103 are external to semiconductor die 801.

As shown in FIG. 11, each skew removal circuit 1117, 1119 and 1121 of clock generation circuit 925 receives clock signal 923. Skew removal circuit 1117 generates a clock signal received by buffer 1105. Skew removal circuit 1119 generates a clock signal received by buffer 1107. Skew removal circuit circuit 1121 generates a clock signal received by buffer 1109. The output of buffer 1105 is clock signal 933. Clock signal 933 is used to clock on chip input/output circuit 927 of semiconductor die 801. Clock signal 935 is used to clock an external semiconductor die, such as for example chip set 929. Clock signal 937 is used to clock another external semiconductor die, such as for example memory 931.

As shown in FIG. 11, each skew removal circuit 1117, 1119 and 1121 of clock generation circuit 925 is also coupled to receive a feedback signal 1111, 1113 and 1115 respectively. As shown in FIG. 11, a clock input of on chip input/output circuit 927 is coupled to an input of skew removal circuit 1117 through feedback signal 1111. A clock input of chip set 929 is fed back into semiconductor die 801 through feedback signal 1113, which is coupled to an input of skew removal circuit circuit 1119. A clock input of memory 931 is fed back into semiconductor die 801 through feedback signal 1115, which is received by an input of skew removal circuit circuit 1121. Similar to the skew removal circuit circuit 1013 of FIG. 10, skew removal circuits 1117, 1119 and 1121 compare the respective input signals and substantially remove any phase differences between the input signals when generating an output clock signal. As a result, clock signals 933, 935 and 937 are all phase locked with each other and in phase with clock signal 923.

Similar to skew removal circuit 1013 of FIG. 10, the skew removal circuits 1117, 1119 and 1121 of FIG. 11 may also be implemented as PLL circuits, or as DLL circuits, or the like, such that there is a substantially zero skew difference between the output clock signals of the DLL circuits and the inputs. Therefore, by using skew removal circuits 1117, 1119 and 1121, skew differences between for example clock signals 923 and feedback signal 1111 are substantially removed when generating the clock signal received by buffer 1105. As a result, there is substantially zero skew in clock signals 933, 935 and 937 relative to clock signal 923. Therefore, input/output communications between semiconductor die 801 through on chip input/output circuit 927 and chip set 929 and memory 931 are phase locked to achieve increased reliability over prior approaches.

Thus, what has been described is a method and apparatus for clocking an integrated circuit in a semiconductor. With the presently described clock distribution network, many identical clocks with relatively no skew can be distributed to a high frequency integrated circuit. Furthermore, one embodiment of the present invention provides a clocking method and apparatus for an entire system such that input/output communications between the semiconductor dice of the system are phase locked with relatively no skew. In addition, one embodiment of the present invention provides an optical clock distribution network that removes large global clock drivers and the global clock distribution from the semiconductor on the chip. This embodiment provides a savings in chip power dissipation, provides additional chip area available for signal routing, or allows the reduction of overall die size, which will in turn lead to higher manufacturing yields and higher frequency operation resulting from shorter interconnect lengths.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A clock distribution network, comprising:
   a clock receiver node disposed in a first semiconductor die, the clock receiver node providing a first clock signal;
   a clock generation circuit disposed in the first semiconductor die, the clock generation circuit coupled to the clock receiver node to generate a second clock signal in phase with the first clock signal to clock a second semiconductor die; and
   a first skew removal circuit included in the clock generation circuit, the first skew removal circuit coupled to the clock receiver node and coupled to a clock input of the second semiconductor die, the first skew removal circuit to generate the second clock signal in response to the first clock signal and a signal of the clock input of the second semiconductor die.

2. The clock distribution network of claim 1 wherein the clock generation circuit further generates a third clock signal in phase with the first clock signal to clock an input/output circuit of the first semiconductor die.

3. The clock distribution network of claim 1 wherein the first skew removal circuit further generates a third clock signal in phase with the first clock signal to clock an input/output circuit of the first semiconductor die.

4. The clock distribution network of claim 1 wherein the clock generation circuit further comprises a second skew removal circuit coupled to receive the first clock signal from the clock receiver node and coupled to a clock input of an input/output circuit of the first semiconductor die, the second skew removal circuit to generate a third clock signal in phase with the first clock signal in response to the first clock signal and a signal of the clock input of the input/output circuit of the first semiconductor die to clock the input/output circuit of the first semiconductor die.

5. The clock distribution network of claim 1 wherein the first skew removal circuit comprises a phase lock loop circuit coupled to receive the first clock signal from the clock receiver node and coupled to the clock input of the second semiconductor die, the phase lock loop circuit to generate the second clock signal.

6. The clock distribution network of claim 1 wherein the first skew removal circuit comprises a delay lock loop circuit coupled to receive the first clock signal from the clock receiver node and coupled to the clock input of the second semiconductor die, the delay lock loop circuit to generate the second clock signal.

7. The clock distribution network of claim 1 further comprising a divide-by-N circuit coupled between the clock receiver node and the clock generation circuit.

8. The clock distribution network of claim 1 wherein the first semiconductor die includes at least a front side and a back side, the clock receiver node configured to receive the optical pulses through the back side of the first semiconductor die.

9. The clock distribution network of claim 1 wherein the first semiconductor die includes at least a front side and a back side, the clock receiver node configured to receive the optical pulses through the front side of the first semiconductor die.

10. The clock distribution network of claim 1 further comprising:
an optical source to generate master optical pulses, the optical source included in a heat sink thermally coupled to the first semiconductor die; and
a diffractive optics element optically coupled between the optical source and the clock receiver node to generate the optical pulses received by the clock receiver node.

11. A method for distributing a clock, comprising:
receiving clock pulses with a clock receiver node disposed in a first semiconductor die to generate a first clock signal;
generating a second clock signal in phase with the first clock signal with a clock generation circuit disposed in the first semiconductor die;
clocking a second semiconductor die with the second clock signal;
receiving a signal of a clock input of the second semiconductor die; and
removing skew between the signal of the clock input of the second semiconductor die and the first clock signal.

12. The method of claim 11 including the step of converting a current generated in the clock receiver node in response to the clock pulses into the first clock signal.

13. The method of claim 11 including the steps of:
generating a third clock signal in phase with the first clock signal with the clock generation circuit; and
clocking an input/output circuit of the first semiconductor die with the third clock signal.

14. The method of claim 11 including the step of dividing the first clock signal by N.

15. The method of claim 11 wherein the first semiconductor die includes at least a front side and a back side, wherein the step of receiving the clock pulses includes the step of receiving the clock pulses through the back side of the first semiconductor die.

16. The method of claim 11 wherein the first semiconductor die includes at least a front side and a back side, wherein the step of receiving the clock pulses includes the step of receiving the clock pulses through the front side of the first semiconductor die.

17. The method of claim 11 including the steps of:
generating master clock pulses with an optical source disposed in a heat sink thermally coupled to the first semiconductor die; and
splitting the master clock pulses to generate the clock pulses received by the clock receiver node.

18. A system, comprising:
a first semiconductor die including a clock receiver node disposed therein, the clock receiver node configured to receive clock pulses to generate a first clock signal, the first semiconductor die further including a clock generation circuit disposed therein coupled to the clock receiver node to generate a second clock signal in phase with the first clock signal;
a second semiconductor die having a clock input coupled to the clock generation circuit to receive the second clock signal, the second semiconductor die configured to be clocked by the second clock signal and;
a first skew removal circuit included in the clock generation circuit, the first skew removal circuit coupled to the clock input of the second semiconductor die and coupled to the clock receiver node, the first skew removal circuit to generate the second clock signal in response to the first clock signal and a signal of the clock input of the second semiconductor die.

19. The system of claim 18 wherein the clock generation circuit further generates a third clock signal in phase with the first clock signal, the first clock signal coupled to an input/output circuit of the first semiconductor die.

20. The system of claim 19 wherein the first skew removal circuit further generates the third clock signal in response to the first clock signal and the signal of the clock input of the second semiconductor die.

21. The system of claim 19 wherein the clock generation circuit comprises:
a first skew removal circuit coupled to the clock input of the second semiconductor die and coupled to the clock receiver node, the first skew removal circuit to generate the second clock signal in response to the first clock signal and a signal of the clock input of the second semiconductor die; and a second skew removal circuit coupled to a clock input of the input/output circuit of the first integrated circuit die and coupled to the clock receiver node, the second skew removal circuit to generate the third clock signal in response to the first clock signal and a signal of the clock input of the input/output circuit of the first integrated circuit die.

22. The system of claim 20 wherein the first skew removal circuit comprises a phase lock loop circuit coupled to the clock input of the second semiconductor die and coupled to the clock receiver node, the phase lock loop circuit to generate the second and third clock signals.

23. The system of claim 20 wherein the first skew removal circuit comprises a delay lock loop circuit coupled to the clock input of the second semiconductor die and coupled to the clock receiver node, the delay lock loop circuit to generate the second and third clock signals.

24. The system of claim 18 wherein the second semiconductor die comprises a chip set.

25. The system of claim 18 wherein the second semiconductor die comprises a memory circuit.

* * * * *